(12) United States Patent
Ashworth

(10) Patent No.: US 10,115,046 B2
(45) Date of Patent: Oct. 30, 2018

(54) MAILPIECES MANUFACTURING, DISTRIBUTION AND COMMUNICATION SYSTEM AND METHOD

(71) Applicant: Neopost Technologies, Bagneux (FR)

(72) Inventor: Peter Ashworth, London (GB)

(73) Assignee: NEOPOST TECHNOLOGIES, Bagneux (FR)

( * ) Notice: Subject to any disclaimer, the term of this patent is extended or adjusted under 35 U.S.C. 154(b) by 0 days.

(21) Appl. No.: 15/649,403

(22) Filed: Jul. 13, 2017

(65) Prior Publication Data

US 2018/0024523 A1    Jan. 25, 2018

(30) Foreign Application Priority Data

Jul. 25, 2016   (EP) ..................... 16305957

(51) Int. Cl.
| | |
|---|---|
| *G06K 19/06* | (2006.01) |
| *G05B 19/12* | (2006.01) |
| *G06Q 30/06* | (2012.01) |
| *G06Q 50/28* | (2012.01) |
| *G06F 17/30* | (2006.01) |
| *G07B 17/00* | (2006.01) |

(52) U.S. Cl.
CPC ..... *G06K 19/06037* (2013.01); *G05B 19/124* (2013.01); *G06Q 30/0633* (2013.01); *G06Q 50/28* (2013.01); *G05B 2219/2671* (2013.01); *G06F 17/30879* (2013.01); *G07B 2017/00588* (2013.01)

(58) Field of Classification Search
CPC .............................................. G06K 19/06037
See application file for complete search history.

(56) References Cited

U.S. PATENT DOCUMENTS

| | | | | |
|---|---|---|---|---|
| 5,933,829 | A * | 8/1999 | Durst ............... | G06F 17/30879 |
| 6,557,755 | B1 | 5/2003 | Pickering, Jr. et al. | |
| 7,451,014 | B2 | 11/2008 | Welch et al. | |
| 8,598,482 | B2 * | 12/2013 | Bonnell .................. | B07C 3/18 |
| | | | | 209/584 |
| 8,798,380 | B1 * | 8/2014 | Windmueller .... | G06F 17/30725 |
| | | | | 382/232 |
| 8,849,722 | B2 * | 9/2014 | Fijnvandraat .... | G07B 17/00467 |
| | | | | 705/1.1 |
| 9,266,298 | B2 * | 2/2016 | Aoto ....................... | B31B 1/88 |

(Continued)

OTHER PUBLICATIONS

European Search Report, dated Dec. 7, 2016, for European Application No. 16 30 5957, 3 pages.

*Primary Examiner* — Thomas Randazzo
(74) *Attorney, Agent, or Firm* — Cozen O'Conner

(57) ABSTRACT

Mailpiece manufacturing, distribution and communication system comprising at least one production center, a production software/server for generating and sending production orders to at least one processing equipment over a network for printing documents and assembling the printed documents in a mailpiece, a distribution center for delivering the mailpiece to a customer and a domain server for interactive customer communication, the mailpiece comprising a single barcode containing a web page link for accessing the domain server and comprising processing equipment control codes or a mailpiece identifier for controlling the at least one processing equipment and for interactive customer communication.

16 Claims, 8 Drawing Sheets

(56) References Cited

U.S. PATENT DOCUMENTS

| | | | | |
|---|---|---|---|---|
| 2006/0122949 A1* | 6/2006 | Poulin | ............... | G07B 17/00024 |
| | | | | 705/402 |
| 2007/0179665 A1* | 8/2007 | Welch | .............. | G07B 17/00467 |
| | | | | 700/220 |
| 2010/0106290 A1* | 4/2010 | Isles | ..................... | B07C 3/20 |
| | | | | 700/227 |
| 2012/0076352 A1* | 3/2012 | Quinn | ..................... | B43M 3/04 |
| | | | | 382/101 |
| 2012/0267430 A1* | 10/2012 | Penny | ..................... | G06Q 10/08 |
| | | | | 235/375 |
| 2013/0066717 A1* | 3/2013 | Marovets | ............... | G06Q 30/02 |
| | | | | 705/14.49 |
| 2016/0155071 A1* | 6/2016 | Ashworth | ........... | G06Q 10/0633 |
| | | | | 705/7.27 |
| 2017/0278063 A1* | 9/2017 | Dixon | ................ | G06Q 10/0836 |
| 2017/0322932 A1* | 11/2017 | Deschenes | ......... | G06K 17/0016 |
| 2018/0114188 A1* | 4/2018 | Miller | ................ | G06Q 10/0838 |
| 2018/0122156 A1* | 5/2018 | Bentley | .................. | G06Q 10/08 |

* cited by examiner

http://xyz.domain.com/ABAAAT/ABC0012310/0000000001
FIG.4
http://xyz.domain.com/?control=ABAAAT&jobid=ABC0012310&mailpieceid=0000000001
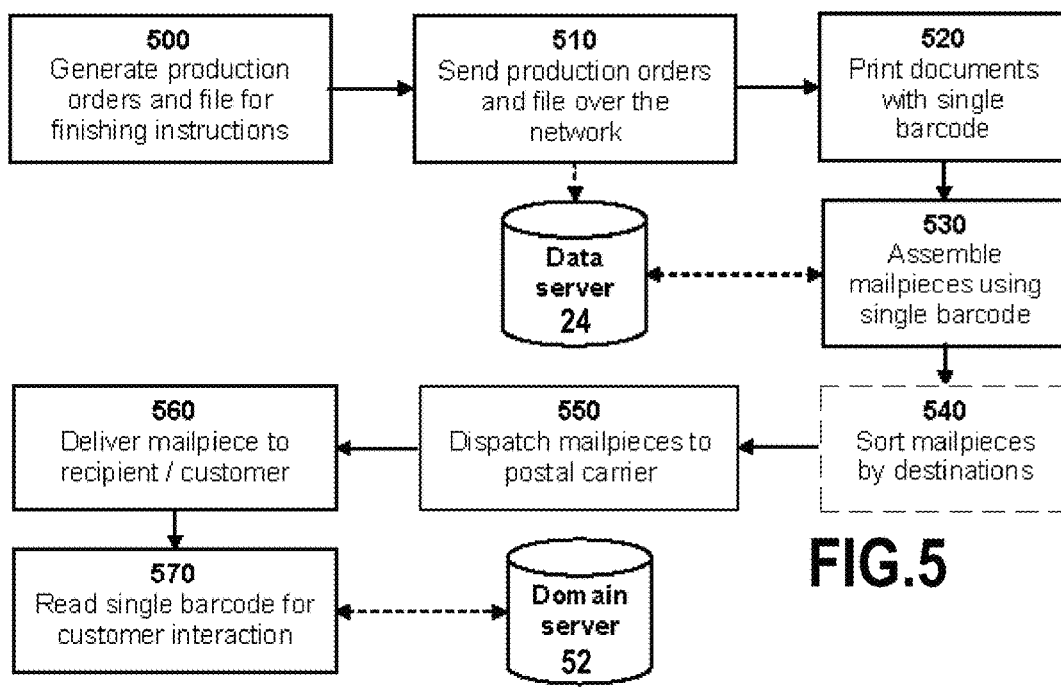
FIG.5

MAILPIECES MANUFACTURING, DISTRIBUTION AND COMMUNICATION SYSTEM AND METHOD

TECHNICAL FIELD

The present application relates to mail processing and customer communication, and notably to improvements in mail production systems incorporating notably paper handling machines used for inserting documents and inserts into envelopes.

BACKGROUND

Despite a noticeable decrease in printed correspondence since the advent of Internet, physical mail remains a preferred and efficient communication channel for many customer segments. Letters have undoubtedly more substance than emails and a higher propensity to capture and retain customer attention. Modern output management technology allows the generation of highly personalized documents, but also to make them more interactive thanks to specific barcodes (e.g., barcode symbols), which behave as hyperlinks on paper. After scanning such barcode with a reader, smartphone or tablet, the customer is directed to supplementary information on a product, service or event on a vendor's web site, or to an enquiry form, or directly to an order confirmation page and/or the payment of an invoice.

U.S. Pat. No. 5,933,829 discloses a system and method for providing automated access to electronic information stored in a database in either a local or remote location. The system utilizes a machine-readable code printed on a document. The machine-readable symbol comprises encoded source data, wherein the source data comprises application launch information as well as file location information. The source data is encoded and printed, and then distributed by the vendor to the end user. The end user then scans the code via appropriate code scanning equipment, decodes the raw decoded data, and the file location information is then used to access the appropriate file. In a preferred embodiment, a Web browser program is launched, and the URL of the vendor's Web site is accessed through the Internet. Additional user-specific demographic data such as the user's name and address may also be encoded in the machine-readable code when the document is specifically tailored for individual targeting, such as mailing labels. This demographic information is uploaded to the Internet Web site for use by the vendor. In addition, the system encodes security data, such as an encryption key, for use in secure data transmissions such as electronic commerce over the Internet.

Amongst these barcodes, QR (Quick Response) codes have become a de-facto standard because of their capacity to encode character strings in a fairly compact manner, and the availability of license-free code generators and interpreters. Additionally, QR codes are easily identifiable by the customer due to their position markers. Indeed, a printed communication may include a variety of other barcodes, which are used either in the manufacturing or the distribution process. For instance control codes and/or mailpiece identifiers are commonly printed as barcodes.

There are several modes of operating an inserter. In the simplest one, the job parameters are fixed and the same tasks are performed on all mailpieces. In a more elaborated mode, corresponds to an open loop production system, each mailpiece bears control codes that are read and interpreted by the inserter (e.g. for adding more pages or inserts). In the most sophisticated (data driven) mode, corresponding to a close loop production system, the mailpiece bears a unique identifier that points to a database where the finishing instructions for that particular mailpiece are recorded.

In the close loop production system, the production software generates a file that contains finishing instructions about each mailpiece that has been printed. As mailpieces enter a processing equipment such as a folder/inserter, their identifiers are scanned, finishing instructions are looked-up in the file and executed. Finishing instructions are typically related to inserts to be added into, or messages to be printed onto the envelopes, or specific sorting conditions. Events linked to a particular mailpiece can be recorded. Mailpieces may also be scanned at the exit of the machine for integrity purposes. Closed loop systems typically require near real-time communication between the equipment performing the work and the computer systems managing the process. This can cause problems during implementation as dedicated local computer networks are required. This adds to the expense and can complicate the integration processes. Closed loop systems rely on the speed of this near real-time communication, with network traffic, distance, and network communication latency having the effect of slowing down equipment or causing it to stop working altogether.

Adversely, in the open loop production system, the production software prints a batch of mailpieces but does not generate a file containing finishing instructions. The finishing instructions are rather included in another barcode which is printed on the mailpiece and can be interpreted directly by the machine. Although they do not require real-time communication and are thus simpler to implement, open loop systems offer much less possibilities in mailpiece customization and have the inherent disadvantages of not providing integrity.

U.S. Pat. No. 7,451,014 describes a mailpiece inserter system including a User PC or computer, a mailpiece inserter and a client server which are network connected to share information and data concerning mail run data. The communication network may be disabled in an open loop control mode to facilitate rapid mailpiece processing and enabled in a closed loop control mode to facilitate tracking, reconciliation and security of mailpiece assembly. The mailpiece inserter includes an inserter control system operative to read and interpret assembly code information directly from the mailpiece content material in the open loop control mode. The client server includes a control system engine operative to receive the assembly code information from the user computer and communicate with the inserter control system of the mailpiece inserter. The bidirectional communication facilitates processing and assembly tracking of the mailpieces in the closed loop control mode.

The dual mode inserter system of U.S. Pat. No. 7,451,014 requires both a mailpiece identifier and an assembly code to be printed on each mailpiece. Other references may also be printed on the mailpiece, either in clear or in barcode format. The appearance of the document may be greatly altered by the presence of multiple barcodes which are not aimed to customers.

Other barcodes can also be added to printed documents or mailpieces to help bank and post office counter clerks process "over-the-counter" bill payments. These barcodes take space away from the message the sender is trying to communicate with the recipient.

Using multiple barcodes on a mailpiece for mailpiece processing and additional barcodes for mailpiece delivery and tracking in the mail stream presents a variety of problems. For example, using different barcode symbologies requires different readers. Another problem with using multiple barcodes on a mailpiece to control mailpiece processing and mail stream tracking operations is that such bar codes make the mailpiece less aesthetically pleasing and reduce the amount of room for other information. Additionally, problems in reading a specific barcode can occur if similar encoding is used in barcodes that are physically close to each other on the printed page. Hardware and/or software readers can become confused, potentially using the incorrect barcode or throwing an error resulting in the stopping of machine processing.

U.S. Pat. No. 6,557,755 unveils a method and systems for tracking and controlling mailpiece processing utilizing one or more postal service mailpiece codes. The postal service mailpiece codes can include a United States Postal Service POSTNET code and a PLANET code. Using the same code or codes for mailpiece processing that the postal service uses to track mailpieces in a mail stream simplifies reader design and decreases the number of codes required to be printed on a mailpiece. In addition, the number of different types of readers for reading the codes is reduced.

Using Postal Service codes as mailpiece identifiers indeed reduces the number of barcodes printed on the mailpiece. However, assembly codes may still be necessary if an open loop control mode is selected. Also Postal Service codes are not the most appealing to customers in terms of aesthetics, and still require a dedicated reader to be interpreted.

Despite the sophistication of modern output management technology, there is still a need to produce customer communications that can be highly customized, made more interactive for the recipient and at the same time use a limited number of barcodes for the production control and the tracking of mailpieces.

Exemplary Objects and Definitions

It is therefore an object to provide a single barcode symbol on a printed page or document that can be used for both the control of the processing equipment during the manufacturing and distribution of a mailpiece and also as a web page link for interactive customer communication.

It is another object to provide a single barcode on a printed page or document that can be used for the control of the processing equipment both in a close loop and in an open loop production control mode.

It is another object to provide a single barcode that can be used for the tracking of the mailpiece during the manufacturing and distribution process.

It is another object to provide a single barcode that is visible through the envelope window after the mailpiece has been inserted to allow scanning at subsequent acts or the manufacturing and distribution process for integrity tracking purposes.

It is another object to provide a single barcode that includes a web page link that is unlocked for interactive customer communication after the mailpiece has reached a predetermined act of the manufacturing and distribution process, considered as the last act before the customer itself interacting with the mailpiece.

It is another object to provide a single barcode that includes a web page link that is unlocked for interactive customer communication following access to the URL from an authenticated source associated with said predetermined last step.

It is another object to provide a single barcode that can be easily interpreted by a processing equipment during the manufacturing of a mailpiece, and by a barcode reader of the recipient for enabling a variety of uses, including but not limited to:

Acknowledge that the recipient has received a particular printed document

Search a data store containing information on a product, service or event

Render a web page for the placement of an order or the paying of an invoice

Provide an Augmented Reality enhancement to the printed document

Host a survey for the recipient to complete

It is a further object to provide a production environment where a barcode is interpreted in a manner specific to each processing equipment, according to a syntax of the barcode or according to segregated access to a data server.

These objects are achieved by a manufacturing, distribution and communication method of mailpieces, comprising: generating production orders; sending said production orders to at least one processing equipment over a network; printing documents; assembling the printed documents in a mailpiece; dispatching the mailpiece; delivering the mailpiece to a customer; and reading the mailpiece for interactive customer communication, wherein for controlling the at least one processing equipment and for interactive customer communication the mailpiece comprises a single barcode containing a web page link for accessing a domain server, and comprising processing equipment control codes or a mailpiece identifier required for controlling the at least one processing equipment.

With this solution using a single barcode (e.g., single barcode symbol comprised of elements of relatively low reflectivity and relatively high reflectivity in a defined area or format, and which encode information according to a symbology), the printed page is simplified and avoids confusion as of which barcode is to be used.

An important advantage is that the same barcode is used when processing the physical printed mailpiece through a folder/inserter, and when the recipient is visiting a web page. This allows the same identifier to be used throughout the whole communication channel, both in the physical and digital arenas.

When read on a folder/inserter, the barcode is decoded and the content is interpreted. Required elements of the content are extracted based either on their fixed position within the content, or by looking for markers within the web page link, for instance the text "control=" to indicate the machine control characters, and the subsequent "&" character as a marker to stop reading.

In a preferred embodiment, the single barcode is a QR Code readable with any commercially available QR Code reader in order to navigate to the URL. The recipient is directly sent to a web page hosted on the server related to the domain page of the web page link. The QR code can enable a variety of uses, from receipt acknowledgement of the mailpiece to Augmented Reality enhancement of the document. The QR Code can also show through the envelope window particularly for integrity/tracking purposes so there is no need to open the envelope. In this case the recipient may be prompted to enter a login and password before accessing a personalized content.

Alternatively, in another embodiment, the URL may only be unlocked after the mailpiece has reached a predetermined act of the process, i.e. once the last act of the manufacturing and/or distribution process has been completed. Unlocking the URL means associating the personalized content intended solely for the customer to the web page link contained in the single barcode, and can be achieved by redirecting to another web page or by updating the web page content. This is particularly useful when the data server and the domain server are a same global data server, and the processing equipment and scanners communicate with the data server (either internal or external) using the domain name gained from the URL. The completion of the last act of the manufacturing and/or distribution process allows the URL to become unlocked for access by the customer.

These objects are also achieved by a production environment where processing equipment have segregated access to a data server. A request to access the web page link indicated by the URL will not necessarily point to the server related to the domain name indicated in the web link, but to a data server internal to the production process.

This data server may reside in the processing equipment itself, or may reside on a local area network (LAN) to which the processing equipment is connected. This data server may also be an external server remote to the production centre and that is accessible through a wide area network (WAN) such as the World Wide Web. This may be the case when the manufacturing process is distributed across multiple production centres or facilities, but also when the mailpiece is tracked during the distribution process, for instance by a delivery agent using a mobile terminal.

Alternatively the processing equipment can communicate with an external data server over a wide area network (WAN) such as the World Wide Web and using the domain name gained from the URL, authenticating its messages as coming from the production environment. In both scenarios, the accessing of the URL from the authenticated source associated with said predetermined last act will allow the URL to become unlocked for access by the final intended recipient of the mailpiece through use of standard QR scanning software.

The object is also achieved by a manufacturing, distribution and communication system comprising at least one production centre, a production software/server for generating and sending production orders over a network to at least one processing equipment for printing documents and assembling the printed documents in a mailpiece, a distribution centre for delivering the mailpiece to a customer and a domain server for interactive customer communication, wherein for controlling the at least one processing equipment and for interactive customer communication the mailpiece comprises a single barcode containing a web page link for accessing the domain server, and comprising processing equipment control codes or a mailpiece identifier.

An object is finally achieved by a single barcode containing a web page link giving access to a domain server for interactive customer communication and comprising processing equipment control codes or a mailpiece identifier required to control at least one processing equipment of a mailpieces manufacturing, distribution and communication system.

BRIEF DESCRIPTION OF THE DRAWINGS

Various embodiments of the invention will be described and explained with additional specificity and detail through the use of the accompanying drawings in which:

FIG. 4 shows in greater detail examples of single barcode symbols according to illustrative embodiments of the invention;

FIG. 5 is a flowchart showing the main acts of a method for practicing an illustrative embodiment of the invention;

DETAILED DESCRIPTION OF EXEMPLARY EMBODIMENTS

Figure 1:
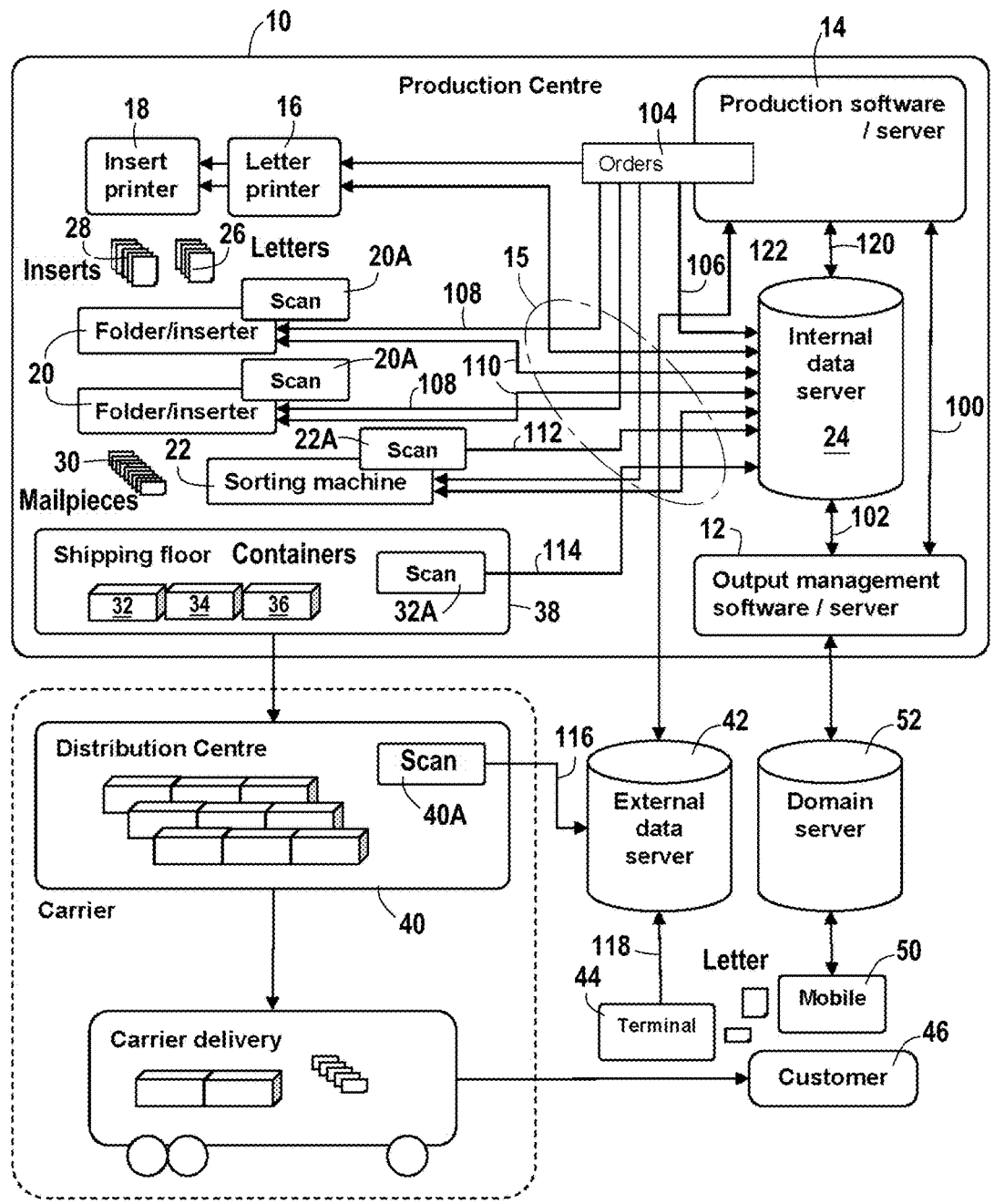
FIG. 1 is a general view of a production environment showing the various components of the manufacturing and distribution system and their interactions during the process.

FIG. 1 is a general view of a production environment showing the various components of the manufacturing and distribution system and their interactions during the process. Most of their components are located inside a production centre 10, commonly referred as a mail factory.

Print data 100 as well as other customer intended data 102 are generated by an output management software residing on a server 12 from an enterprise application software such as an enterprise resource planning (ERP) or a customer relationship management (CRM) software. The output management software doesn't need to be hosted in the production centre and has been represented there only for convenience. These data may include the data to be printed on a document as well as data to be displayed on a customer's mobile device, but also assembly instructions for the mailpiece that has to be sent to the customer.

Data pertaining to the manufacturing process are sent to a production software, which resides on a server 14 connected to various processing equipment and data servers through a network 15. This network may be a local area network (LAN) if all these components are located in the same centre or a wide area network (WAN) if the manufacturing process is distributed across multiple facilities. Based on the data received from the output management software, the production software generates production orders 104, corresponding to identified production batches or jobs, for the processing equipment.

These equipment may include a document or letter printer 16, an insert printer 18, one or several folder/inserters 20, one or several sorting machines 22. If the folder/inserters are operated in a close loop control mode, the production software generates a file 106 containing finishing instructions about each mailpiece and sends it to an internal data server 24. Otherwise, if the folder/inserters are operated in an open loop control mode, the finishing instructions 108 are printed on the mailpiece(s). The letters 26 and insert 28 are then brought to the folder/inserter 20. Depending on the control mode of the folder/inserter, identifiers or assembly codes are scanned (through a scanner 20A) and the mailpieces 30 are assembled. In the close loop control mode, the finishing instructions are looked-up in a file 110 corresponding to the particular production order 106 that has been sent to the internal data server 24.

Once the mailpieces have been assembled, these can be brought to the sorting machine 22 to be sorted by destinations or according to other criteria. For instance a part of the batch may require immediate delivery while the delivery may be deferred for another part. Generally, the mailpieces have been already printed in a distribution order, but still need to be physically dispatched in separate containers 32, 34, 36 according to their destinations and then brought to the shipping floor 38. It is also possible to extract or divert mailpieces that the sender no longer wishes to send to the customer.

A scan (with scanners 20A, 22A, 32A) may be performed at the exit of each processing equipment for integrity/tracking purposes. Identifiers 112 of the mailpieces are reported to the internal data server 24. An identifier 114 of the container may also be scanned and associated to the mailpieces that has been dispatched therein. These scanning data may be used to prepare a statement of mailing for submission to a postal carrier. Similarly, a scan may be performed on a mailpiece that has been found isolated or damaged at any stage of the process.

The mailpiece are then shipped to a postal or private carrier. The carrier operates its own distribution centre 40 where the mailpieces can be sorted and finally dispatched according to their final destinations. Mailpieces may be scanned (with scanner 40A) at various acts of the distribution process, till the final carrier delivery, if the identifier is visible through the envelope window. Identifiers 116 of the mailpieces are reported to a data server, which in this case is preferably, but not necessarily, an external data server 42. The mailpiece may also be scanned by a delivery agent using a mobile terminal 44 when it is delivered to the customer 46.

Scanning events occurring at each act of the manufacturing and/or distribution process are recorded along with an identity of the concerned scanner or equipment. The source of the event can be authenticated by various techniques depending on the desired level of security. One particular act of the manufacturing and/or distribution process is considered as the last act before the customer itself interacting with the mailpiece. The position of this act may vary greatly, from the exit of the inserter when the mailpiece has just been assembled, to the recipient's door or mailbox when it is delivered to the customer.

The internal and/or external data servers 24, 42 are in bidirectional communication (respectively 120, 122) with the production server 14. Integrity/tracking reports can be consolidated by the production software and fed back to the output management software. Alternatively, the output management software may have direct access to the data servers in order to check the status of a whole production batch or a single mailpiece. Excerpts of the reports can also be sent to the enterprise application (ERP or CRM).

When scanning the mailpiece with a mobile device 50, such as a smartphone or tablet, the recipient is directly sent to a web page hosted on the server 52 related to the domain name indicated in the web page link contained in the barcode identifier. The web page link is unique to a particular customer communication as is the corresponding unique mailpiece identifier. No confusion is possible as there is only one printed barcode on the letter. This single barcode is preferably a QR Code readable with any commercially available QR Code reader in order to navigate to the URL. The QR code can enable a variety of uses, from receipt acknowledgement of the mailpiece to Augmented Reality enhancement of the document. The QR Code can also show through the envelope window so there is no need to open it. In this case the recipient may be prompted to enter a login and password before accessing a personalized content.

It is to be noted that access that the URL may only be unlocked once the last act of the manufacturing and/or distribution process has been completed. This is particularly useful when the data server (either internal or external) and the domain server are the same, and the processing equipment and scanners communicate with the data server using the domain name gained from the URL. The completion of the last act of the manufacturing and/or distribution process allows the URL to become unlocked for access by the customer.

Figure 2:
FIG. 2 shows an example of cover page of a mailpiece of the prior art.

FIG. 2 shows an example of cover page of a mailpiece of the prior art, which is the first page of a letter or document intended to a recipient, generally a customer of the sender's organisation. The cover page bears the address of the recipient and can be the sole page of the letter (in which case it is often referred as the mailpiece). The letter can also have several pages, to which one or several inserts can be added. Inserts are additional documents that are not personalized, such as commercial leaflets or booklets, inquiry forms or business reply envelopes. Inserts are usually printed in large quantities and brought directly to the inserter according to the specific jobs that have to be processed. Alternatively, inserts may also be printed of demand when a certain level of personalization is required.

The letter pages and inserts are folded together and/or inserted in an envelope, forming a complete mailpiece, so that the address of the recipient can be seen through the envelope, window (depicted in dotted lines). The cover page has two bi-dimensional barcodes printed on it. The one located at the bottom of the page is a QR code used for interactive customer communication. The one located close to the address block is a datamatrix used as mailpiece identifier for machine control in the close loop control mode. This barcode is also visible through the envelope window to allow scanning of the mailpiece after insertion for integrity/tracking purposes. Some processing equipment may only work in the open loop control mode, in which case a third barcode containing the machine control codes, like for instance the linear barcode represented in the top right corner, shall be printed on the cover page, and eventually on each subsequent page.

Figure 3A:
FIG. 3A shows an example of cover page of a mailpiece according to an illustrative embodiment the invention.

FIG. 3A shows an example of cover page of a mailpiece according to an illustrative embodiment of the invention. The cover page has only a single barcode that is used for both the control of the processing equipment and also as a web page link for interactive customer communication. This single barcode is preferably a QR Code readable with any commercially available QR Code reader in order to navigate to the URL. No confusion is possible as there is only one printed barcode on the letter. This single barcode contains the machine (processing equipment) control codes required for the open loop control mode and/or the mailpiece identifier required for the close loop control mode, so that no additional barcode needs to be printed on the mailpiece/cover page.

Figure 3B:
FIG. 3B shows an alternative example of the cover page of FIG. 3A.

In the example of FIG. 3A, the position of the envelope window is depicted in dotted line. The barcode is no longer visible after the mailpiece has been assembled. This is also the case when there is no window, and the address is printed on the envelope, as part of the finishing instructions. However, if further scanning of the mailpiece identifier is required for integrity/tracking purposes, the single barcode may be located close to the address block as illustrated in the example of FIG. 3B. The sender has however to make sure that the postal regulations authorize the printing of other barcodes (e.g. Datamatrix or QR codes) next to the address block.

FIG. 4 shows in greater detail two examples of single barcode symbols according to an illustrative embodiment of the invention. For better understanding, the URL content is shown below each barcode, but this URL content may be printed at the bottom of the cover page as illustrated in FIGS. 3A and 3B, or preferably not printed at all, although some customers may need or prefer to type the web page link in the browser of their personal computer.

Part of this URL includes the machine control code characters and/or integrity/tracking identifier such as Job ID and/or Mailpiece ID, herein referred simply as "mailpiece identifier", and used for integrity/tracking purpose.

The content of the single barcode (top of FIG. 4) is:
http://xyz.domain.com/ABAAAT/ABC0012310/0000000001/

The content of the single barcode (bottom of FIG. 4) is:
http://xyz.domain.com/control=ABAAAT&jobid=ABC0012310&mailpieceid=0000000001&

Where:
http://xyz.domain.com is the address of the domain server
ABAAAT are machine control codes
ABC0012310 is the Job ID
0000000001 is the Mailpiece ID When read on a folder/inserter, the barcode is decoded and the content is interpreted. Required elements of the content are extracted based either on their fixed position within the content, or by looking for markers, for instance the text "control=" to indicate the machine control characters, the text "jobid=" to indicate the Job ID characters, the text "mailpieceid" to indicate the Mailpiece ID characters, and the subsequent "&" character as a marker to stop reading.

The whole content of the barcode is a single URL that can be used as a web page link. It is to be noted that the folder/inserter may access the finishing instructions by using this web page link. The machine is directed to the internal data server where the file containing the instructions has been deposited by the production server along with, or as part of, the production order. This is possible because processing equipment have segregated access to the internal data server. In other words, the URL does not direct them to the domain server but rather to the internal data server connected on the same LAN.

Alternatively, the machine may be directed to the external (remote) data server that is accessible through a wide area network (WAN) such as the World Wide Web. This may be the case when the manufacturing process is distributed across multiple facilities, but also when the mailpiece is tracked during the distribution process.

The machine may also be directed to the domain server when the data server (either internal or external) and the domain server are the same, and the processing equipment and scanners communicate with the data server using the domain name gained from the URL.

FIG. 5 is a flowchart showing the main acts of a method of practicing an illustrative embodiment of the invention, which corresponds to an embodiment where the single barcode is not visible through the envelope window. In this situation, the act considered as the last act before customer interaction is preferably just after the mailpiece has been inserted. For convenience, the acts before the start of the manufacturing process are ignored.

At act 500, the production software of server 14 generates the production orders 104 and, eventually, a file 106 containing the finishing instructions based on the data received from the output management software of server 12. At act 510, the production orders 104 and the file 106 are sent over the network, to the processing equipment 16, 18, 20, 22 and the internal data server 24, respectively. At act 520, the documents are printed in the letter 16 and insert 18 printers with a single barcode appearing on each cover letter. At act 530, the mailpieces are assembled by the folder/inserter 20 using the single barcode, eventually referring to the internal data server 24. As stated above, this act is considered as the last before the customer itself interacting with the mailpiece. At act 540, the mailpieces are sorted by destination into the sorting machine 22 and, at act 550, dispatched to the postal carrier. Alternatively, the sorting of the mailpieces may take place at a distribution centre of the carrier. Then at act 560, the mailpiece is delivered to the customer/recipient and, at act 570, the recipient or customer reads the single barcode with the mobile device 50 and is directly sent to a web page hosted on the domain server 52.

In this implementation, the internal data server 24 is preferably, but not necessarily, an internal server of the production centre 10, and is distinct from the domain server 52. As the processing equipment do not have access to the domain server, there is no need to unlock the URL.

Figure 6:
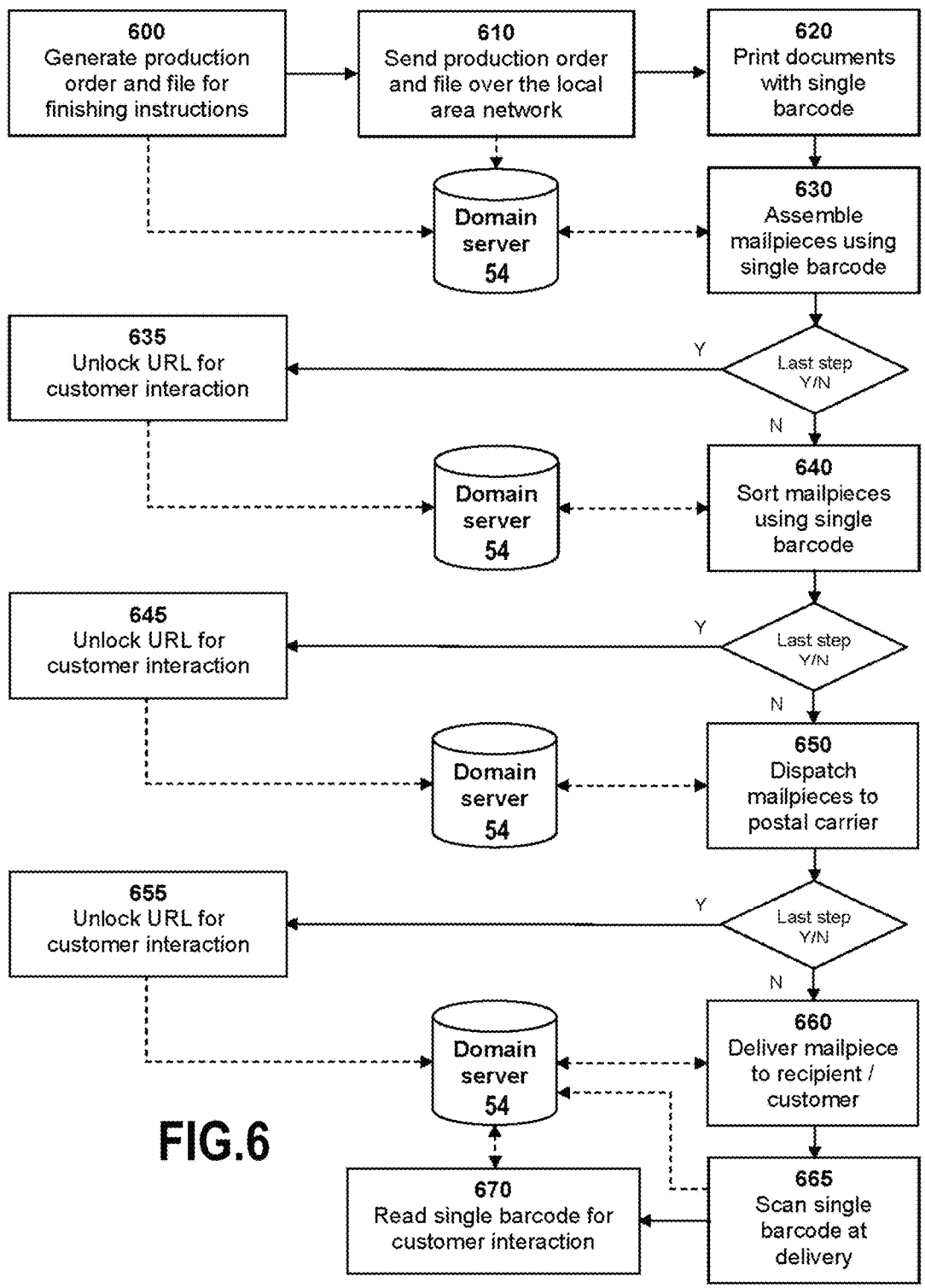
FIG. 6 is a flowchart showing an alternative method for practicing an illustrative embodiment of the invention.

FIG. 6 is a flowchart showing an alternative method of practicing an illustrative embodiment of the invention, which corresponds to an embodiment where the single barcode symbol is visible through the envelope window, and thus can still be scanned after the mailpiece has been inserted. In this situation, the act considered as the last before customer interaction may be any act until the mailpiece is delivered to the recipient. Additionally, it is considered in this embodiment that the data server and the domain server are the same, jointly referred as the global domain server 54. This situation may occur when a single entity is in charge of preparing the mailpiece and the personalized content accessible with the URL, both intended to the same customer.

At act 600, the production software of server 14 generates the production orders 104 and, eventually, a file 106 containing the finishing instructions based on the data received from the output management software of the server 12. At act 610, the production orders 104 and the file 106 are sent over the network, to the processing equipment 16, 18, 20, 22 and the global domain server 54, respectively. At act 620, the documents are printed in the letter 16 and insert 18 printers with a single barcode appearing on each cover letter. At act 630, the mailpieces are assembled by the folder/inserter 20 using the single barcode, eventually referring to the global domain server 54. Concomitantly, a check is performed to determine whether this act is the last before the customer itself interacting with the mailpiece. If the answer is yes, the URL is unlocked at act 635 to enable later customer interaction. Whatever the answer, the manufacturing process continues to act 640 where the mailpiece are sorted by destination into the sorting machine 22, eventually using the single barcode as a trigger for the sortation. Similarly, a check is performed to determine whether this act is the last act before the customer itself interacting with the mailpiece. If the answer is yes, the URL is unlocked at act 645. The process continues at act 650, where the mailpieces are dispatched to the postal carrier.

Several scans may occur during the distribution process for integrity/tracking purposes. It is important that the URL is not unlocked before the act considered as the last before the customer itself interacting with the mailpiece. Therefore scanning events are recorded along with an identity of the concerned scanner or equipment so that the source of the event can be authenticated. At act 660, the mailpiece is delivered to the recipient and the URL is unlocked at act 665, if it was not unlocked before, when the delivery agent scans the single barcode with its mobile terminal 44. Ultimately at act 670, the recipient or customer reads the single barcode with the mobile device 50 and is directly sent to a web page hosted on the global domain server 54.

Figure 7:
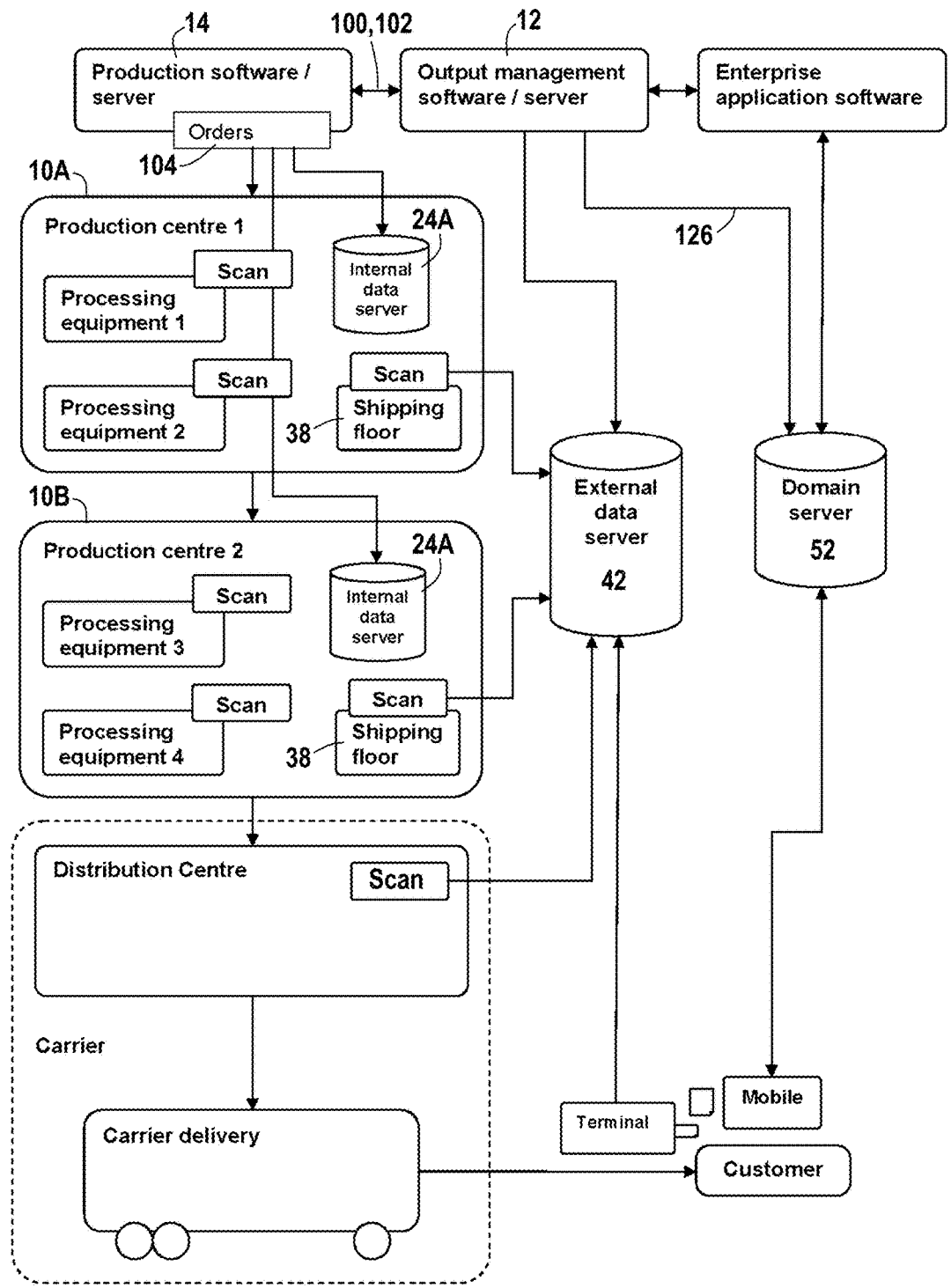
FIG. 7 is an extended view of a production environment for practicing an illustrative embodiment of the method.

FIG. 7 is an extended view of a production environment in which the manufacturing process is distributed across multiple facilities 10A, 10B, from which only two (production centre 1 and production centre 2) are represented for convenience.

Print data 100 as well as other customer intended data 102 are generated by the output management software from an enterprise application software such as an enterprise resource planning (ERP) or a customer relationship management (CRM) software. Data pertaining to the manufacturing process are sent to the production server 14. Based on the data received from the output management software, the production software generates production orders 104, corresponding to identified production batches or jobs, for the processing equipment distributed across the multiple facilities 10A, 10B.

The production orders 104 are sent to the processing equipment in the facilities and to one or several data servers 24A, 24B of these facilities. The finishing instructions corresponding to a production order are replicated in the internal data server 24A or 24B of the facility in which the mailpieces will be manufactured. The processing equipment are connected to the internal data server through a local area network (not illustrated). This is particularly useful to avoid latencies and/or connection issues with the external (remote) data server 42. The production orders are also sent to the external data server 42 where scanning events 114, 116 occurring into the shipping floor 38 or at a later stage of the distribution process are reported.

Other customer intended data 126 are generated by the output management software and sent to the domain server 52. This situation occurs when a single entity is in charge of preparing the mailpiece and the personalized content accessible with the URL intended to the same customer. Alternatively, the domain server 52 may be in communication with the sole enterprise application software independently from the manufacturing and distribution process. This may not be the simplest implementation as the relationship between the mailpiece identifier and the URL must be univocal, in order for the customer to access his personalized content when reading the single barcode with his mobile device. However, this is possible if the output management software and the enterprise application software are in bidirectional communication. In any case, customer feedback and interaction with the web page hosted on the domain server may always be reported to the enterprise application software.

Figure 8:
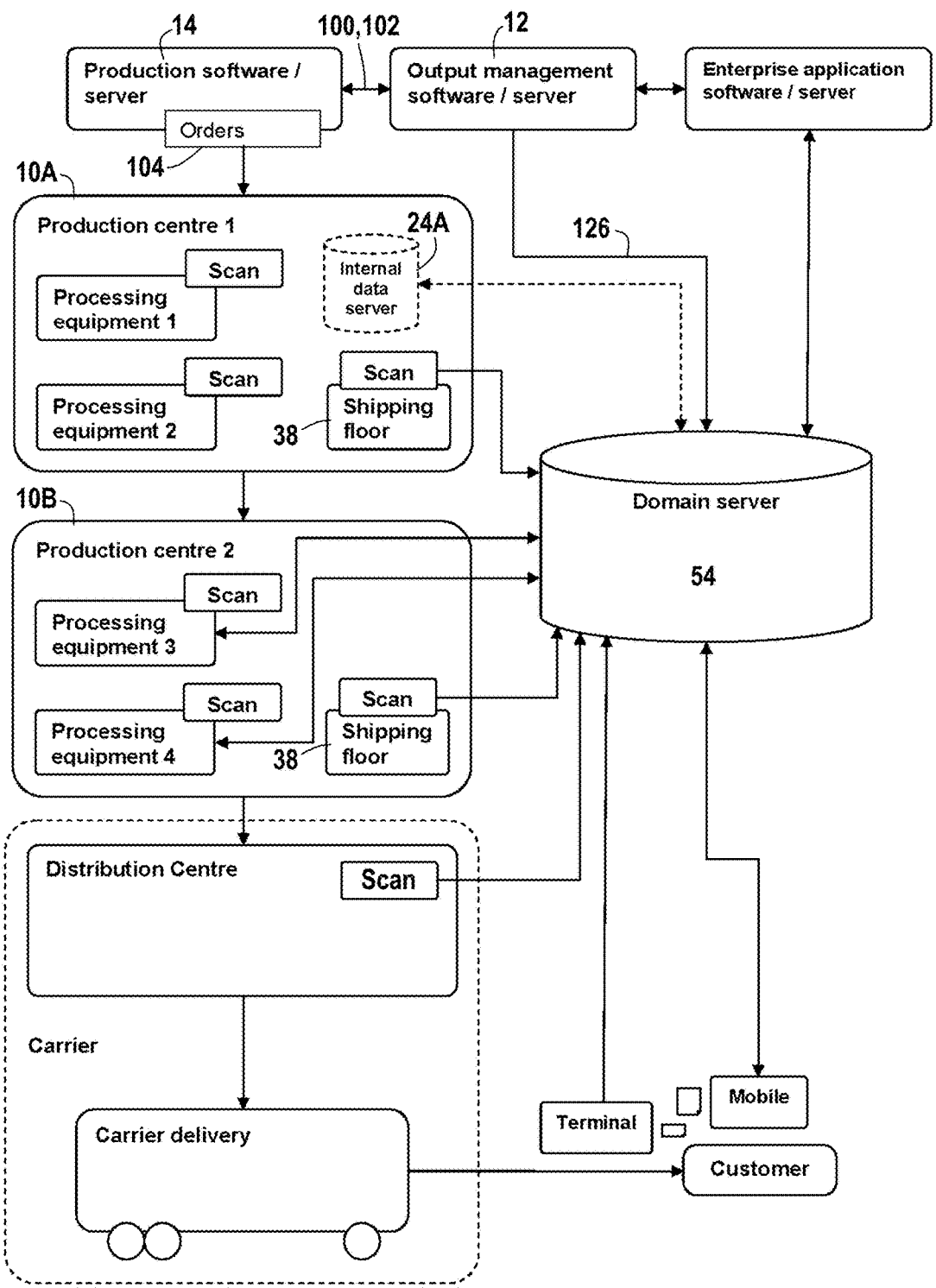
FIG. 8 is a view of an alternative production environment for practicing an illustrative embodiment of the method.

FIG. 8 is a view of an alternative production environment for practicing the method. This embodiment corresponds to the method of FIG. 6 where the external data server and the domain server are the same, jointly referred as the global domain server 54. The operations are the same as in the embodiment of FIG. 7 except that the finishing instructions are sent to the global domain server 54, which is connected to the processing equipment through a wide area network. Alternatively, the finishing instructions may be replicated in the internal data server 24A to avoid latencies and/or connection issues with the global domain server 54. Scanning events 114, 116 occurring into the shipping floor 38 or at a later stage of the distribution process are reported to the global domain server 54 until the mailpiece reaches the act considered as the last before customer interaction and the URL is unlocked.

FIGS. 1 to 8 described above are only illustrative. Many variations and combinations are possible whiteout departing from the spirit and scope of the invention, either in the single code syntax, the cover page layout, the production environment or the manufacturing and distribution process. For instance, the output management and production software's may reside on the same physical server. Similarly, any of the output management and production physical servers may include the data server or the domain server. It is also possible to extract part of the mailpiece identifier and to reprint it (but not the complete URL) on the envelope when it is inserted. This will allow scanning the mailpiece at subsequent acts of the manufacturing and distribution process without compromising the privacy of the personalized content. However the object of the invention is not to provide additional barcode symbols, but primarily to provide a single barcode symbol on a printed page or document that can be used for both the control of the processing equipment of a mailpiece and also as a web page link for interactive customer communication.

The invention claimed is:

1. A manufacturing, distribution and communication method of mailpieces, the method comprising:
generating production orders;
sending said production orders to at least one processing equipment over a network;
printing documents;
assembling the printed documents in a mailpiece;
dispatching the mailpiece;
delivering the mailpiece to a customer; and
reading the mailpiece for interactive customer communication,
wherein for controlling the at least one processing equipment and for interactive customer communication the mailpiece comprises a single barcode containing a web page link for accessing a domain server, and comprising processing equipment control codes or a mailpiece identifier required for controlling the at least one processing equipment.

2. The method of claim 1, wherein the single barcode is a QR Code.

3. The method of claim 1, wherein processing equipment control codes or the mailpiece identifier are extracted based either on fixed positions in the web page link or by looking for markers.

4. The method of claim 1, wherein the at least one processing equipment has segregated access to a data server.

5. The method of claim 1, wherein the web page link is unlocked after the mailpiece has reached a predetermined act of the method.

6. The method of claim 1, wherein said single barcode is visible through an envelope window of the mailpiece for integrity/tracking purposes.

7. A mailpieces manufacturing, distribution and communication system, comprising at least one production centre, a production software/server for generating and sending production orders over a network to at least one processing equipment for printing documents and assembling the printed documents in a mailpiece, a distribution centre for delivering the mailpiece to a customer and a domain server for interactive customer communication, wherein for controlling the at least one processing equipment and for interactive customer communication the mailpiece comprises a single barcode containing a web page link for accessing the domain server, and comprising processing equipment control codes or a mailpiece identifier.

8. The mailpieces manufacturing, distribution and communication system of claim 7, wherein the single barcode is a QR Code.

9. The mailpieces manufacturing, distribution and communication system of claim 7, further comprising a data server for storing finishing instructions of the mailpiece.

10. The mailpieces manufacturing, distribution and communication system of claim 9, wherein the network is a local network of the production centre and the data server is an internal data server of the production centre.

11. The mailpieces manufacturing, distribution and communication system of claim 9, wherein the network is a wide area network and the data server is an external data server remote to the production centre.

12. The mailpieces manufacturing, distribution and communication system of claim 11, wherein the manufacturing of mailpieces is distributed across a plurality of production centres or facilities.

13. The mailpieces manufacturing distribution and communication system of claim 11, wherein the external data server and the domain server are a same global domain server accessible through a wide area network.

14. A single machine-readable symbol containing a web page link giving access to a domain server for interactive customer communication and comprising processing equipment control codes or a mailpiece identifier required to control at least one processing equipment of a mailpieces manufacturing, distribution and communication system.

15. The single machine-readable symbol of claim 14, comprising the following contents:
   http://xyz.domain.com/ABAAAT/ABC0012310/
      0000000001/
   or
   http://xyz.domain.com/control=ABAAAT&jobid=
      ABC0012310&mailpieceid=00 00000001&
   where:
      http://xyz.domain.com is the address of the domain server;
      ABAAAT are processing equipment control codes;
      ABC0012310 is a Job ID; and
      0000000001 is a Mailpiece ID.

16. The single machine-readable symbol of claim 14 wherein the single machine-readable symbol is a two-dimensional barcode symbol.

* * * * *

UNITED STATES PATENT AND TRADEMARK OFFICE
CERTIFICATE OF CORRECTION

Page 1 of 1

PATENT NO.          : 10,115,046 B2
APPLICATION NO.     : 15/649403
DATED               : October 30, 2018
INVENTOR(S)         : Peter Ashworth It is certified that error appears in the above-identified patent and that said Letters Patent is hereby corrected as shown below:

In the Claims

Column 13, Line 16, Claim 13:
"The mailpieces manufacturing distribution and"
Should read:
--The mailpieces manufacturing, distribution and--.

Column 14, Lines 10-11, Claim 15:
"http://xyz.domain.com/control=ABAAAT&jobid=ABC0012310&mailpieceid=00 00000001&"
Should read:
--http://xyz.domain.com/control=ABAAAT&jobid=ABC0012310&mailpieceid=0000000001&--.

Signed and Sealed this
Twenty-fifth Day of June, 2019

Andrei Iancu
*Director of the United States Patent and Trademark Office*